United States Patent
Lee

(10) Patent No.: US 11,088,428 B2
(45) Date of Patent: Aug. 10, 2021

(54) RECHARGEABLE BATTERY

(71) Applicant: SAMSUNG SDI CO., LTD., Yongin-si (KR)

(72) Inventor: Wonjun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1003 days.

(21) Appl. No.: 14/532,157

(22) Filed: Nov. 4, 2014

(65) Prior Publication Data
US 2015/0221927 A1    Aug. 6, 2015

(30) Foreign Application Priority Data

Feb. 5, 2014   (KR) .................. 10-2014-0013333

(51) Int. Cl.
*H01M 50/578*   (2021.01)
*H01M 50/147*   (2021.01)
(Continued)

(52) U.S. Cl.
CPC ....... *H01M 50/578* (2021.01); *H01M 50/147* (2021.01); *H01G 9/0003* (2013.01); *H01G 11/16* (2013.01); *H01H 35/26* (2013.01); *H01H 35/346* (2013.01); *H01M 2200/00* (2013.01); *H01M 2200/20* (2013.01)

(58) Field of Classification Search
CPC .... H01M 2/345; H01M 2/04; H01M 2200/20; H01M 2/1223; H01M 2/1235; H01M 2/1252; H01M 2/34; H01M 2200/00; H01M 2/20; H01M 50/578; H01M 50/147;
(Continued)

(56) References Cited

U.S. PATENT DOCUMENTS 6,342,826 B1 * 1/2002 Quinn .................. H01H 35/343
337/13
2011/0052949 A1 * 3/2011 Byun .................. H01M 2/0473
429/61
(Continued)

FOREIGN PATENT DOCUMENTS

EP    0739047 A2    10/1996
EP    2284932 A1    2/2011
(Continued)

OTHER PUBLICATIONS

Extended European Search Report dated Apr. 23, 2015.
(Continued)

*Primary Examiner* — Milton I Cano
*Assistant Examiner* — Kiran Akhtar
(74) *Attorney, Agent, or Firm* — Lee IP Law, PC

(57) ABSTRACT

A rechargeable battery includes an electrode assembly in a case, and a cap assembly coupled to the case, the cap assembly having a cap plate sealing the case, the cap plate including a short-circuit hole and a conductive groove surrounding the short-circuit hole, an inversion plate in the conductive groove of the cap plate, a connection plate covering the short-circuit hole of the cap plate, and a short-circuit member between the connection plate and the inversion plate, the short-circuit member at least partially passing through the short-circuit hole and contacting the connection plate.

18 Claims, 5 Drawing Sheets

(51) Int. Cl.
*H01H 35/26* (2006.01)
*H01G 9/00* (2006.01)
*H01G 11/16* (2013.01)
*H01H 35/34* (2006.01)

(58) Field of Classification Search
CPC ........ H01G 11/16; H01G 2/14; H01G 9/0003; H01H 35/26; H01H 35/346
See application file for complete search history.

(56) References Cited

U.S. PATENT DOCUMENTS

| | | | | |
|---|---|---|---|---|
| 2011/0177387 A1* | 7/2011 | Byun | ...................... | H01M 2/04 429/178 |
| 2011/0183197 A1* | 7/2011 | Byun | .................. | H01M 2/0473 429/185 |
| 2012/0183818 A1* | 7/2012 | Byun | .................. | H01M 2/0473 429/61 |
| 2012/0263976 A1 | 10/2012 | Byun et al. | | |
| 2015/0079432 A1* | 3/2015 | Okuda | ................... | H01G 11/16 429/61 |

FOREIGN PATENT DOCUMENTS

| | | | |
|---|---|---|---|
| EP | 2299512 A1 | 3/2011 | |
| EP | 2348559 A1 | 7/2011 | |
| KR | 10-2011-0025056 A | 3/2011 | |
| KR | 10-2011-0084079 A | 7/2011 | |
| KR | 10-2011-0087567 A | 8/2011 | |
| KR | 10-2012-0089983 A | 8/2012 | |
| KR | 10-2012-0118315 A | 10/2012 | |
| WO | WO2013154166 * | 10/2013 | .............. H01M 2/34 |

OTHER PUBLICATIONS

European Office Action dated Jul. 21, 2017 of the European Patent Application No. 14199615.7 corresponding to this application.
Korean Notice of Allowance dated Aug. 31, 2020.

* cited by examiner

RECHARGEABLE BATTERY

BACKGROUND

1. Field

Embodiments relate to a rechargeable battery.

2. Description of the Related Art

Generally, unlike a primary battery which is not designed to be recharged, a rechargeable secondary battery is capable of being repeatedly charged and discharged. A low-capacity secondary battery composed of a single battery cell may be used as a power source for various small, portable electronic devices, e.g., cellular phones or camcorders. A high-capacity secondary battery in which a plurality of battery cells are connected to each other in a pack structure may be used as a power source for driving motors, e.g., a motor of a hybrid electric vehicle (HEV), and the like.

Secondary batteries may be manufactured in various shapes, e.g., cylindrical shapes or prismatic shapes. A typical secondary battery may include an electrode assembly having a positive plate and a negative plate with a separator acting as an insulator between the positive and negative plates accommodated in a battery case with an electrolyte, and a cap plate having electrode terminals coupled to the case.

SUMMARY

Embodiments are directed to a rechargeable battery, which includes an additional short-circuit member between an inversion plate and a connection plate, thereby improving safety by preventing the inversion plate from being damaged due to short-circuits.

At least one of the above and other features and advantages may be realized by providing a rechargeable battery including an electrode assembly, a case accommodating the electrode assembly, and a cap assembly coupled to the case, the cap assembly including a cap plate sealing the case, the cap plate including a short-circuit hole and a conductive groove surrounding the short-circuit hole, an inversion plate in the conductive groove of the cap plate, a connection plate covering the short-circuit hole of the cap plate, and a short-circuit member between the connection plate and the inversion plate, the short-circuit member at least partially passing through the short-circuit hole and contacting the connection plate.

The inversion plate may be formed in the conductive groove of the cap plate when viewed from the electrode assembly.

The inversion plate may include a downwardly convex round portion and an edge portion fixed to the cap plate.

When the internal pressure of the rechargeable battery reaches a critical value, the round portion of the inversion plate may protrude toward the short-circuit member to upwardly push the short-circuit member.

The short-circuit member may be upwardly pushed in a direction in which the inversion plate protrudes to then come into contact with the connection plate.

After the short-circuit member comes into contact with the connection plate, a current path ranging from the cap plate to the connection plate may be formed.

The conductive groove may be formed in one surface of the cap plate when viewed from the electrode assembly.

The short-circuit member may include a support part positioned on a surface of the inversion plate, and a body part extending from the support part to be inserted into the short-circuit hole of the cap plate.

An outer diameter of the body part may be smaller than or equal to an inner diameter of the short-circuit hole.

A height of the body part may be greater than a height ranging from the surface of the cap plate having the conductive groove to a surface of the connection plate facing the cap plate.

The body part may include a first body portion extending from the support part, and a second body portion extending from the first body portion and having an outer diameter smaller than an outer diameter of the first body portion.

The second body portion may have a cross section shaped to be stepped with respect to the first body portion.

The second body portion may have a cross section shaped to be inwardly inclined with respect to the short-circuit hole.

A height of the second body portion may be smaller than a height ranging from the surface opposite to the surface of the cap plate having the conductive groove to a surface of the connection plate facing the cap plate.

An outer diameter of the support part may be greater than an inner diameter of the short-circuit hole.

The short-circuit member may be made of a conductive material.

The inversion plate may be made of a non-conductive material.

An insulation layer may be formed on a surface of the inversion plate.

The insulation layer may be formed on the surface of the inversion plate when viewed from the short-circuit hole.

The insulation layer may be coated with a Teflon® resin.

An insulation member may be formed between the connection plate and the cap plate, and a through-hole sized to correspond to the short-circuit hole may be formed in the insulation member.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
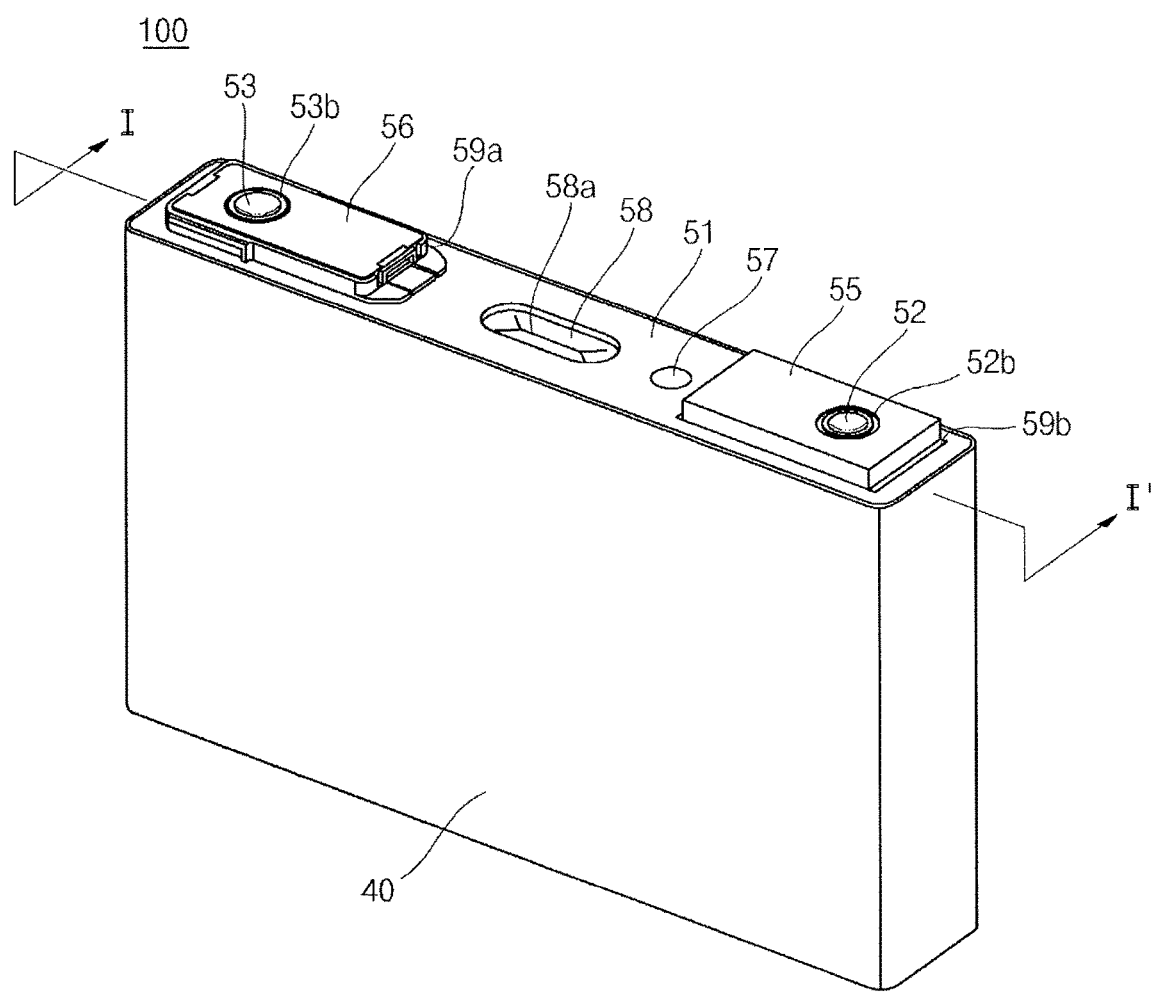
FIG. 1 illustrates a perspective view of a rechargeable battery according to an embodiment.

Korean Patent Application No. 10-2014-0013333, filed on Feb. 5, 2014, in the Korean Intellectual Property Office, and entitled: "Rechargeable battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
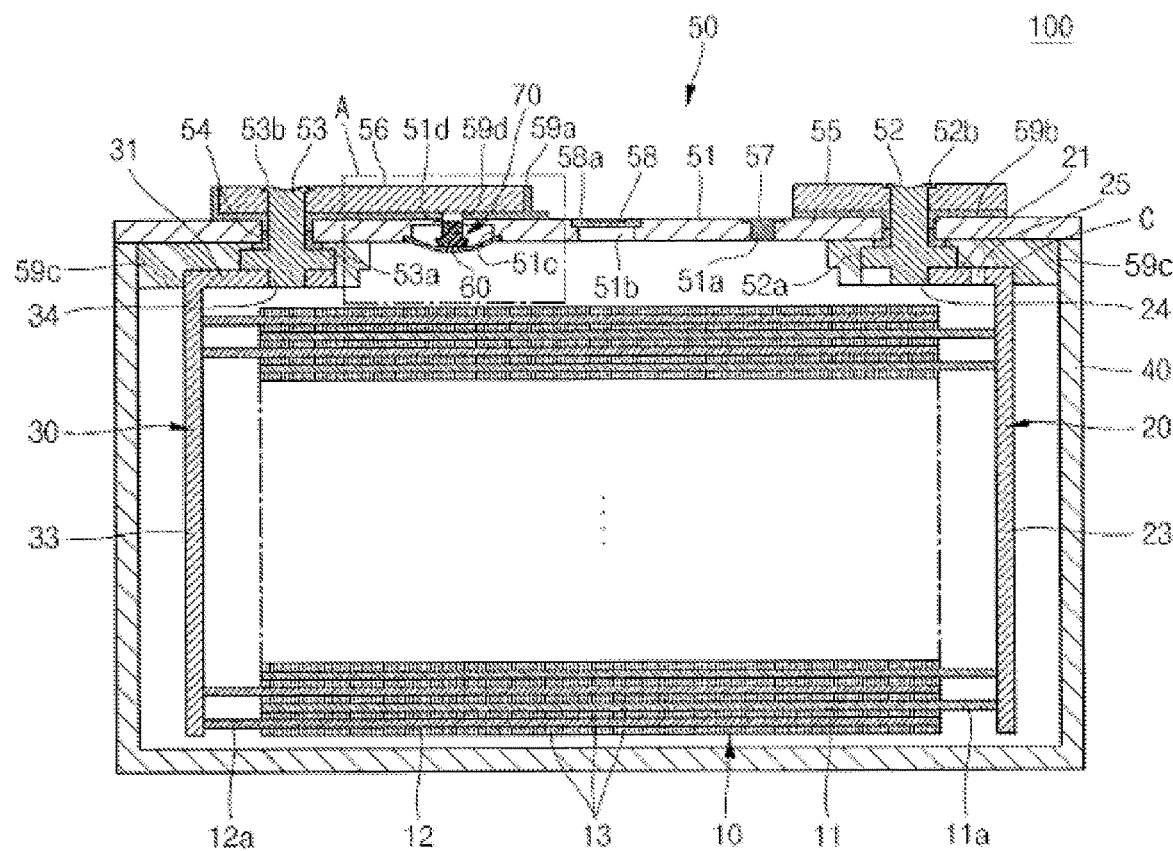
FIG. 2 illustrates a cross-sectional view along line I-I' of FIG. 1.
Figure 3A:
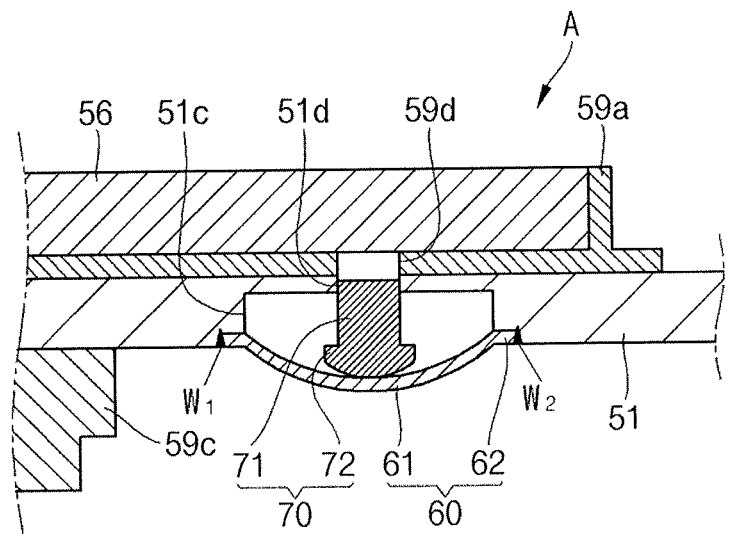
FIG. 3A illustrates an enlarged cross-sectional view of a portion 'A' in FIG. 2.
Figure 3B:
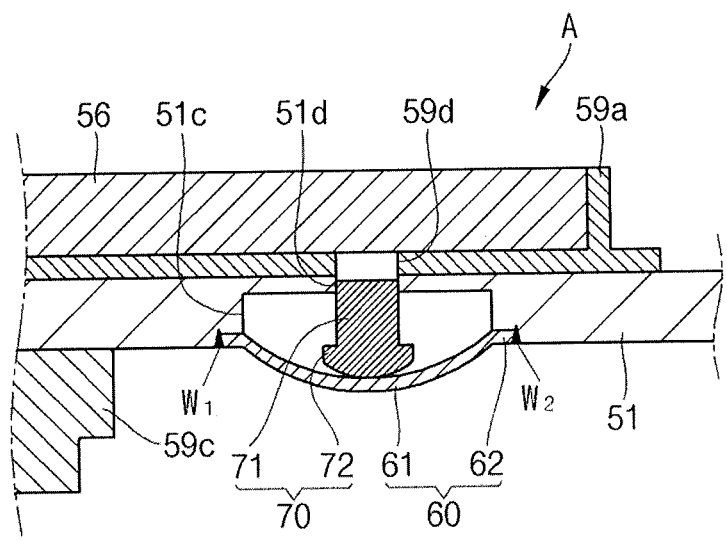
FIG. 3B illustrates an inversion plate in contact with a connection plate.
Figure 4:
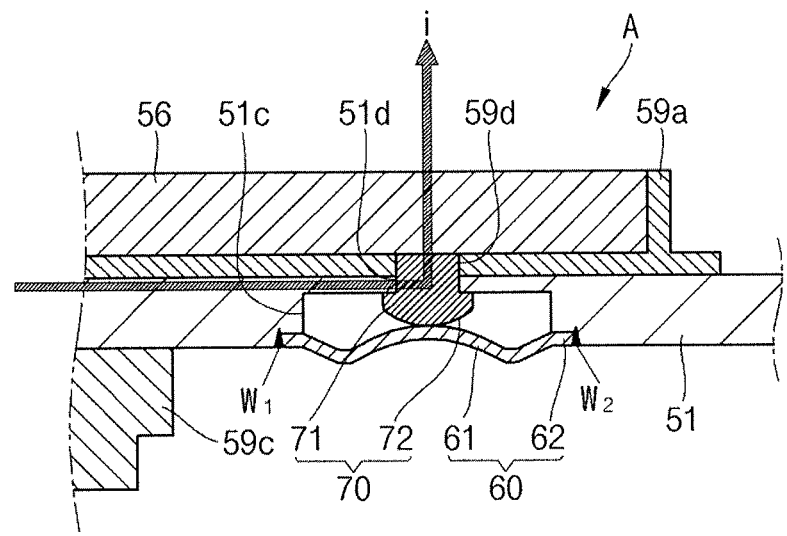
FIG. 4 illustrates a current path formed when the inversion plate shown in FIG. 3A operates.

FIG. 1 illustrates a perspective view of a rechargeable battery according to an embodiment of the present invention, FIG. 2 illustrates a cross-sectional view of the rechargeable battery taken along line I-I' of FIG. 1. FIG. 3A illustrates an enlarged cross-sectional view of a portion 'A' shown in FIG. 2, FIG. 3B illustrates an inversion plate shown in FIG. 3A making contact with a connection plate, and FIG. 4 illustrates a current path formed when the inversion plate shown in FIG. 3A operates.

Referring to FIGS. 1 and 2, a rechargeable battery 100 according to an embodiment may include an electrode assembly 10, a first collector plate 20, a second collector plate 30, a case 40, and a cap assembly 50.

The electrode assembly 10 according to this embodiment may include a wound or laminated stacked structure having a first electrode plate 11, a separator 13, and a second electrode plate 12, and may have a thin plate or a thin foil shape. For example, the first electrode plate 11 may be a positive electrode and the second electrode plate 12 may be a negative electrode.

The first electrode plate 11 may be formed by coating a first electrode active material, e.g., a transition metal oxide, on a first electrode collector made of a metal foil, e.g., an aluminum (Al) foil. In addition, the first electrode plate 11 may include a first electrode uncoated portion 11a where the first electrode active material is not applied. The first electrode uncoated portion 11a may function as a passage for current flowing between the first electrode plate 11 and an exterior of the first electrode plate 11. Embodiments are not limited to the material of the first electrode plate 11 listed herein, and may be any suitable material.

The second electrode plate 12 may be formed by coating a second electrode active material, e.g., a graphite or carbon, on a second electrode collector made of a metal foil, e.g., a nickel or copper foil. In addition, the second electrode plate 12 may include a second electrode uncoated portion 12a where the negative electrode active material is not applied. The second electrode uncoated portion 12a may function as a passage for current flowing between the second electrode plate 12 and an exterior of the second electrode plate 12. Embodiments are not limited to the material of the second electrode plate 12 listed herein.

In other embodiments, polarities of the first and second electrode plates 11 and 12 may differ from what is described above. That is to say, the first electrode plate 11 may be a negative electrode and the second electrode plate 12 may be a positive electrode.

The separator 13 may be positioned between the first electrode plate 11 and the second electrode plate 12 to prevent electrical short circuits and to allow movement of lithium ions. The separator 13 according to this embodiment may be made of, e.g., polyethylene, polypropylene, or a combination of polypropylene and polyethylene. Embodiments are not limited to the material of the separator 13 listed herein.

The first collector plate 20 and the second collector plate 30, electrically connected to the first electrode plate 11 and the second electrode plate 12, respectively, are coupled to both ends of the electrode assembly 10.

The first collector plate 20 may be made of a conductive metal, e.g., aluminum (Al), and may be coupled with the first electrode uncoated portion 11a protruding out from a first end of the electrode assembly 10 and electrically connected to the first electrode plate 11. The first collector plate 20 may include a first coupling part 21, a first extension part 23, a first terminal hole 24, and a fuse part 25.

The first coupling part 21 may include a plate positioned between a top portion of the electrode assembly 10 and a bottom portion of the cap assembly 50. Here, the first terminal hole 24 and the fuse part 25 are formed in the first coupling part 21.

The first extension part 23 may be bent and extended from an end of the first coupling part 21, and may be formed as a plate substantially contacting the first electrode uncoated portion 11a. As illustrated in FIG. 2, a corner portion at which the first coupling part 21 and the first extension part 23 meet, e.g., contact each other, is denoted by 'C', and the first coupling part 21 and the first extension part 23 may be perpendicular to each other about the corner C.

The first terminal hole 24 is formed at a first side of the first coupling part 21. The first terminal hole 24 penetrates through the first coupling part 21 and provides for a space of the first coupling part 21, to which a first electrode terminal 52 of the cap assembly 50 is inserted and coupled.

The fuse part 25 is formed on the top portion of the electrode assembly 10, e.g., above the electrode assembly 10, so as not to make contact with the electrolyte, e.g., to avoid potential ignition of the electrolyte by heat generated in the fuse part 25. As illustrated in FIG. 2, the fuse part 25 is formed in a region adjacent to the corner C of the first coupling part 21, e.g., at a second side of the first coupling part 21 opposite to the first side of the first coupling part 21, so as not to overlap with the first electrode terminal 52 coupled to the first terminal hole 24.

The fuse part 25 may function as a fuse that cuts off the flow of current, e.g., the fuse part 25 may melt by heat generated when a large amount of current flows due to a short-circuit in the rechargeable battery 100. For example, the short-circuit in the rechargeable battery 100 may be triggered by inverting an inversion plate 60 to allow a short-circuit member 70 and a second connection plate 56 to make contact with each other when heat is generated due to overcharging of the rechargeable battery 100 and the internal pressure of the rechargeable battery 100 exceeds a preset pressure due to decomposition of electrolyte. Accordingly, when the fuse part 25 is melted due to the short-circuit triggered by overcharging, the fuse part 25 cuts off the flow of current through the first collector plate 20 in advance to interrupt charging or discharging of the rechargeable battery 100 before the rechargeable battery 100 is confronted with a risk, e.g., with a fire or an explosion.

The second collector plate 30 is made of a conductive material, e.g., nickel (Ni) or copper (Cu), and contacts the second electrode uncoated portion 12a protruding out from a second end of the electrode assembly 10 and electrically connected to the second electrode plate 12. The second collector plate 30 may include a second coupling part 31, a second extension part 33, and a second terminal hole 34.

Unlike the first collector plate 20 shown in FIG. 2, the second collector plate 30 according to an embodiment may not include a fuse part, e.g., does not include a part corresponding to the fuse part 25. In particular, it is sufficient to have only one of the first and second collector plates 20 and 30 with the fuse part 25 functioning as a fuse. In addition, since the first collector plate 20 is made of a metal having a lower melting point than that of the second collector plate 30, e.g., the first collector plate 20 may be made of aluminum, a fuse function can be more easily achieved in the first collector plate 20.

The case 40 may be made of a conductive metal, e.g., aluminum, an aluminum alloy, or a nickel plated steel, and may have an approximate hexahedron shape having an opening through which the electrode assembly 10, the first collector plate 20, and the second collector plate 30 may be inserted and placed. Since the case 40 and the cap assembly 50 in an assembled form are illustrated in FIG. 2, the opening of the case 40 according to this embodiment corresponds to a substantially opened portion of an edge of the cap assembly 50. The inner surface of the case 40 according to this embodiment may be insulated from the electrode assembly 10, the first and second collector plates 20 and 30, and the cap assembly 50. In this embodiment, the case 40 has a predetermined polarity, e.g., the case 40 may be a positive electrode. In addition, the case 40 may contain an electrolytic solution. The electrolytic solution may include, e.g., a carbonate based solvent, such as dimethyl carbonate (DMC), diethyl carbonate (DEC), dipropyl carbonate (DPC), methyl propyl carbonate (MPC), ethyl propyl carbonate (EPC), methylethyl carbonate (MEC), ethylene carbonate (EC), propylene carbonate (PC), or butylenes carbonate (BC), but the electrolytic solution is not limited thereto.

The cap assembly 50 is coupled to the case 40. In detail, the cap assembly 50 may include a cap plate 51, the first electrode terminal 52, a second electrode terminal 53, a gasket 54, a first connection plate 55, and a second connection plate 56. In addition, the cap assembly 50 may further include a plug 57, a vent plate 58, an upper insulation member 59a, a connection plate 59b, a lower insulation member 59c, the inversion plate 60, and the short-circuit member 70.

The cap plate 51 is configured to close the opening of the case 40. The cap plate 51 may be made of the same material as that of the case 40. The cap plate 51 may include a short-circuit hole 51d and a conductive groove 51c surrounding the short-circuit hole 51d. The cap plate 51 may have the same polarity as the case 40.

As illustrated in FIGS. 2 and 3A, the short-circuit hole 51d is a hole through the cap plate 51, so the short-circuit member 70 positioned on the inversion plate 60 passes through the short-circuit hole 51d. The short-circuit hole 51d is formed on a bottom surface of the conductive groove 51c. The short-circuit hole 51d is configured such that its inner diameter is equal to or greater than a diameter of a top portion of the short-circuit member 70. Accordingly, the short-circuit member 70 may easily pass through the short-circuit hole 51d, e.g., the top portion of the short-circuit member 70 may be positioned within the short-circuit hole 51d during normal operation of the rechargeable battery 100 (FIG. 3A).

The conductive groove 51c is formed on one surface of the cap plate 51 facing the electrode assembly 10, i.e., on a bottom surface of the cap plate 51, to have a predetermined depth so as to correspond to the inversion plate 60. As illustrated in FIG. 2, the depth of the conductive groove 51c is smaller than a total thickness of the cap plate 51, so a portion of the cap plate 51 separates the conductive groove 51c from a top surface of the cap plate 51, i.e., a surface of the cap plate 51 facing an exterior of the rechargeable b battery 100. The inversion plate 60 is formed at both sidewalls of the conductive groove 51c. That is, a peripheral edge part 62 (FIG. 3A) of the inversion plate 60 is fixed to both sidewalls of the conductive groove 51c by, e.g., welding.

The first electrode terminal 52, passing through one side of the cap plate 51, may be electrically connected or coupled to the first collector plate 20. The first electrode terminal 52 according to this embodiment may be shaped like a pillar rivet-coupled to the first connection plate 55 at its upper portion exposed to an upper portion of the cap plate 51, and may include a protrusion 52b extending horizontally to overlap a portion of an upper surface of the first connection plate 55 to prevent the first electrode terminal 52 from being dislodged from the cap plate 51. A flange 52a is formed at a lower portion of the pillar located adjacent to a lower portion of the cap plate 51, i.e., under a bottom surface of the cap plate 51, to prevent the first electrode terminal 52 from being dislodged from the cap plate 51. A portion of the pillar of the first electrode terminal 52 located at a lower portion of, e.g., below, the flange 52a may be fitted into the terminal hole 24 of the first collector plate 20. In this embodiment, the first electrode terminal 52 may be electrically connected or coupled to the cap plate 51.

The second electrode terminal 53, passing through the other side of the cap plate 51, may be electrically connected or coupled to the second collector plate 30. Since the second electrode terminal 53 has the same configuration as the first electrode terminal 52 according to this embodiment, repeated descriptions will be omitted. In this embodiment, the second electrode terminal 53 may be insulated from the cap plate 51.

The gasket 54, according to an embodiment, may be made of an insulating material and may be positioned between each of the first electrode terminal 52 and the second electrode terminal 53 and the cap plate 51 to seal the space between the respective electrode terminal 52 or 53 and the cap plate 51. The gasket 54 may prevent introduction of external moisture into the rechargeable battery 100 or may prevent leakage of electrolyte from the rechargeable battery 100.

The first connection plate 55 is rivet-coupled to the upper pillar of the first electrode terminal 52 to fix the first electrode terminal 52 to the cap plate 51. The second connection plate 56 is rivet-coupled to the upper pillar of the second electrode terminal 53 to fix the second electrode terminal 53 to the cap plate 51. The second connection plate 56 is configured such that the second electrode terminal 53 is fitted into the second connection plate 56 from an exterior side spaced apart from the cap plate 51, i.e., from above the upper insulation member 59a, and extends to cover the short-circuit hole 51d. The second connection plate 56 is electrically connected to the second electrode terminal 53. The second connection plate 56 triggers a short-circuit when it contacts the short-circuit member 70, i.e., when the short-circuit member 70 is pushed upwardly by the inversion plate 60.

That is, when heat is generated in the can 40, e.g., due to a high-voltage open-circuit occurring in a state in which the second connection plate 56 is connected to an external rechargeable battery or due to overcharging of the rechargeable battery 100, or when the internal pressure in the can exceeding a preset pressure due to decomposition of electrolyte, the inversion plate 60 is inverted toward the second connection plate 56, i.e., the inversion plate 60 is protruding upwardly and convexly, and pushes the short-circuit member 70 thereon through the short-circuit hole 51*d* to contact the second connection plate 56. The contact between the short-circuit member 70 and the second connection plate 56 triggers a short circuit, thereby causing a large amount of current to flow and generate heat. The increased current flow and generated heat melt the fuse part 25, thereby improving safety of the rechargeable battery 100.

The plug 57 is configured to seal an electrolyte injection hole 51*a* of the cap plate 51. The vent plate 58 includes a notch 58*a* and is positioned within a vent hole 51*b* of the cap plate 51 and configured to open at a preset pressure.

The upper insulation member 59*a* is configured to be inserted between the second electrode terminal 53 and the cap plate 51, contacting the cap plate 51 and the gasket 54. The upper insulation member 59*a* insulates the second electrode terminal 53 from the cap plate 51. In addition, the upper insulation member 59*a* includes a through-hole 59*d* sized to correspond to, e.g., overlap, the short-circuit hole 51*d*. The through-hole 59*d* is a hole through which the short-circuit member 70 positioned on the inversion plate 60 passes. The short-circuit hole 51*d* is configured to have an inner diameter equal to or greater than the inner diameter of the top surface of the short-circuit member 70.

The connection plate 59*b* is formed to be inserted between the first electrode terminal 52 and the cap plate 51 and makes close contact with the cap plate 51 and the gasket 54 through the first connection plate 55. The connection plate 59*b* electrically connects the first electrode terminal 52 to the cap plate 51.

The lower insulation member 59*c* is formed between each of the first collector plate 20 and the second collector plate 30 and the cap plate 51 and is configured to prevent unnecessary short circuits from occurring therein.

Referring to FIG. 3A, the inversion plate 60 is formed in the conductive groove 51*c* of the cap plate 51 when viewed from the electrode assembly 10. That is, the inversion plate 60 is installed on both sidewalls of the conductive groove 51*c* formed on the bottom surface of the cap plate 51 by welding W1, W2. During normal operation of the rechargeable battery 100, the inversion plate 60 includes a downwardly convex round portion 61 (facing an interior of the case 40 and protruding toward the electrode assembly 10) and the peripheral edge portion 62 fixed to the cap plate 51. The inversion plate 60 may invert upwardly to convexly protrude when heat is generated due to a high-voltage open-circuit occurring in a state in which the second connection plate 56 is connected to an external rechargeable battery or overcharging of the rechargeable battery 100, or when the internal pressure exceeds a preset pressure due to decomposition of electrolyte.

When the inversion plate 60 is inverted to upwardly push the short-circuit member 70 positioned thereon, the short-circuit member 70 passes through the conductive groove 51*c* of the cap plate 51 and through the through-hole 59*d* of the upper insulation member 59*a* to contact the second connection plate 56 (FIG. 3B). The contact between the short-circuit member 70 and the second connection plate 56 causes a short-circuit, thereby melting, e.g., breaking, the fuse part 25 due to the short-circuit. Accordingly, charging or discharging of the rechargeable battery 100 may be interrupted before a risky condition, e.g., an ignition or an explosion, occurs to the rechargeable battery 100. That is, the inversion plate 60 upwardly pushes the short-circuit member 70 to be positioned between the short-circuit hole 51*d* and the through-hole 59*d* to make contact with the second connection plate 56 to cause the short-circuit to the rechargeable battery 100 and to cut off the flow of current by melting the fuse part 25 through the short-circuit, thereby increasing safety of the rechargeable battery 100.

The inversion plate 60 may be made of a non-conductive material. Therefore, according to embodiments, as shown in FIG. 4, the inversion plate 60 functions just as a switching element in such a manner that it is inverted to protrude upwardly when the internal pressure of the rechargeable battery 100 rises. In addition, the inversion plate 60 makes high current (i) flow from the cap plate 51 to the second connection plate 56 through the short-circuit member 70, while the high current (i) is generated due to the short-circuit occurring when the inversion plate 60 upwardly pushes the short-circuit member 70 positioned thereon and makes contact with the second connection plate 56.

The short-circuit member 70 is formed between the second connection plate 56 and the inversion plate 60. The short-circuit member 70 is upwardly pushed toward the second connection plate 56 as the inversion plate 60 protrudes, so that it passes through the short-circuit hole 51*d* of the cap plate 51 to then make contact with the second connection plate 56. After the short-circuit member 70 makes contact with the second connection plate 56, a current path is formed, i.e., the current path flowing from the cap plate 51 to the second connection plate 56. Meanwhile, the short-circuit member 70 has the same polarity as the cap plate 51. In addition, the short-circuit member 70 may be made of aluminum, but is not limited thereto.

Referring to FIG. 3B, the short-circuit member 70 includes a support part 72 positioned on, e.g., directly on, a surface of the inversion plate 60 and a body part 71 extending from the support part 72 and passing through the short-circuit hole 51*d* of the cap plate 51. An outer diameter of the body part 71 is smaller than or equal to an inner diameter of the short-circuit hole 51*d*. In addition, a height of the body part 71 is equal to or greater than a distance from a surface of the conductive groove 51*c* to a bottom surface of the second connection plate 56 facing the cap plate 51, e.g., a height of the body part 71 may equal a total thickness of the upper insulation member 59*a* and the portion of the cap plate 51 separating the conductive groove 51*c* from the second connection plate 56. An outer diameter of the support part 72 is greater than the inner diameter of the short-circuit hole 51*d*. With this configuration, upon inversion of the inversion plate 60, the support part 72 contacts the surface of the conductive groove 51*c* and the body part 71 contacts the second connection plate 56. That is, the support part 72 supports the body part 71 within the short-circuit hole 51*d* and the through-hole 59*d* without further raising thereof.

Figure 5:
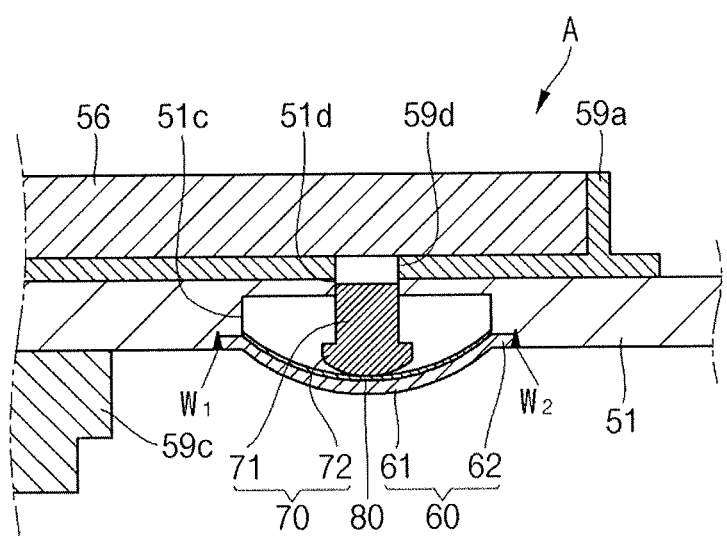
FIG. 5 illustrates an enlarged cross-sectional view of another embodiment of a portion 'A' shown in FIG. 2.

Next, a rechargeable battery according to another embodiment will be described with reference to FIG. 5. FIG. 5 illustrates an enlarged cross-sectional view of another embodiment of a portion 'A' shown in FIG. 2.

The rechargeable battery shown in FIG. 5 is substantially the same as the rechargeable battery 100 shown in FIG. 2 in terms of configuration and functions, except that it further includes an insulation layer 80 formed on a top surface of the inversion plate 60. Accordingly, repeated descriptions will be omitted and the following description will focus on the insulation layer 80 formed on the top surface of the inversion plate 60.

Referring to FIG. 5, the insulation layer 80 is formed on the top surface of the inversion plate 60, e.g., the insulation layer 80 may be between the inversion plate 60 and the short-circuit member 70. The insulation layer 80 prevents current from flowing from the inversion plate 60 positioned thereunder to the short-circuit member 70 positioned thereon. Here, the insulation layer 80 is formed by coating an insulating material on the top surface of the inversion plate 60. The insulating material may include, e.g., a Teflon® resin, but not limited thereto. Meanwhile, in a case where the insulation layer 80 is provided, the inversion plate 60 may be made of a conductive or non-conductive material. However, when the inversion plate 60 is made of a non-conductive material, an increased insulation of the short-circuit member 70 from a current flow may be provided. Although not shown, the insulation layer 80 may be formed on only a portion of the top surface of the inversion plate 60, e.g., only on a portion of the top surface of the inversion plate 60 that directly contacts the support part 72 of the short-circuit member 70.

Figure 6:
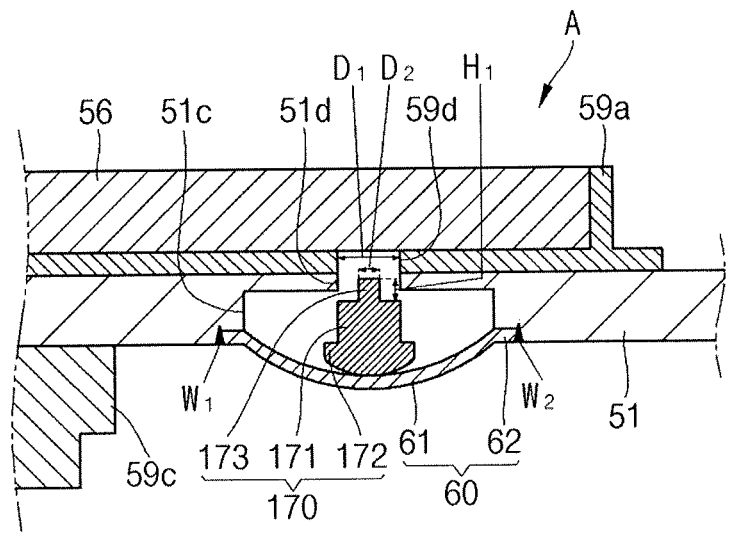
FIG. 6 illustrates an enlarged cross-sectional view of still another embodiment of a portion 'A' shown in FIG. 2.
Figure 7:
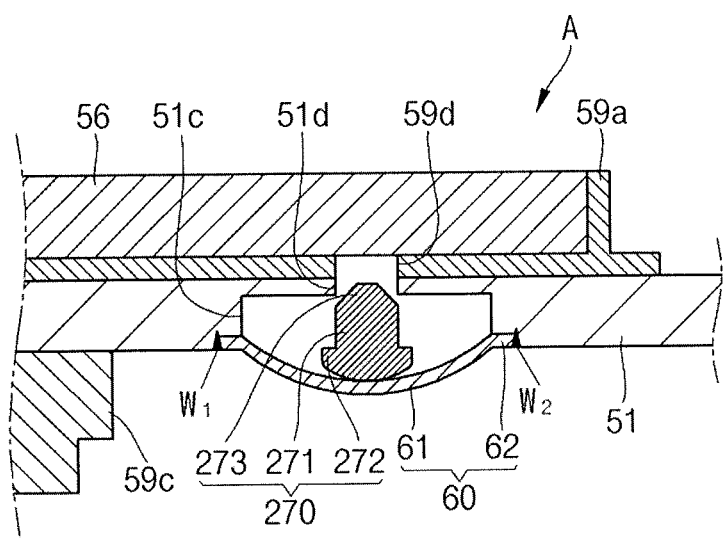
FIG. 7 illustrates an enlarged cross-sectional view of yet another embodiment of a portion 'A' shown in FIG. 2.

FIG. 6 illustrates an enlarged cross-sectional view, depicting still another embodiment of portion 'A' shown in FIG. 2, and FIG. 7 illustrates an enlarged cross-sectional view, depicting yet another embodiment of portion 'A' shown in FIG. 2.

The rechargeable batteries shown in FIGS. 6 and 7 are substantially the same as the rechargeable battery 100 shown in FIG. 2 in terms of configuration and functions, except for the configuration of short-circuit member 170 and 270 positioned on the top surface of an inversion plate 60, respectively. Accordingly, repeated descriptions will be omitted and the following description will focus on the short-circuit members 170, 270 positioned on the top surface of the inversion plate 60.

Referring to FIG. 6, the short-circuit member 170 is configured such that a diameter of its top portion is smaller than a diameter of its bottom portion. Accordingly, the short-circuit member 170 may easily pass through the short-circuit hole 51d of the cap plate 51 and the through-hole 59d of the upper insulation member 59a. In more detail, a body part of the short-circuit member 170 includes a first body portion 171 and a second body portion 173. The first body portion 171 is a region extending from a support part 172, and the second body portion 173 is formed to extend from the first body portion 171 into the short-circuit hole 51d of the cap plate 51. The second body portion 173 has an outer diameter D2 that is smaller than an outer diameter D1 of the first body portion 171. The second body portion 173 has a cross section shaped to be stepped with respect to the first body portion 171. In addition, a height H1 of the second body portion 173 is smaller than a distance from the surface of the conductive groove 51c to the bottom surface of the second connection plate 56 facing the cap plate 51.

Referring to FIG. 7, the short-circuit member 270 is configured such that a diameter of its top portion is smaller than a diameter of its bottom portion. Accordingly, the short-circuit member 270 may easily pass through the short-circuit hole 51d of the cap plate 51 and the through-hole 59d of the upper insulation member 59a. In more detail, a body part of the short-circuit member 270 includes a first body portion 271 and a second body portion 273. The first body portion 271 is a region extending from a support part 272, and the second body portion 273 is formed to extend from the first body portion 271 into the short-circuit hole 51d of the cap plate 51. The second body part 273 has an outer diameter that is smaller than an outer diameter of the first body portion 271. The second body portion 273 has a cross section shaped to be inwardly inclined with respect to the short-circuit hole 51d. In addition, a height of the second body portion 273 is smaller than a distance from the surface of the conductive groove 51c to the bottom surface of the second connection plate 56 facing the cap plate 51.

As described above, in the rechargeable battery according to embodiments, the short-circuit member 70 is further provided between the inversion plate 60 and the second connection plate 56, thereby preventing the inversion plate 60 from being damaged due to high current in a short-circuit. As such, the rechargeable battery according to embodiments exhibits improved safety by preventing a battery cell from malfunctioning.

By way of summary and review, when an internal pressure of a secondary battery rises due to excess heat or decomposition of an electrolytic solution within the battery, a fire or an explosion may occur within the secondary battery. Accordingly, it is necessary to manufacture a secondary battery having improved safety. Therefore, the rechargeable battery, according to example embodiments, includes an additional short-circuit member between an inversion plate and a connection plate, thereby improving safety by preventing the inversion plate from being damaged due to short-circuits.

While the invention has been described in connection with certain exemplary embodiments, it will be understood by those skilled in the art that the invention is not limited to the disclosed embodiments, but rather is intended to cover various modifications included within the spirit and scope of the appended claims and equivalents thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
    an electrode assembly including first and second electrodes, which have opposite polarities to each other;
    a case accommodating the electrode assembly;
    first and second connection plates respectively coupled to first and second electrode terminals, the first electrode terminal being electrically connected to the first electrode, and the second electrode terminal being electrically connected to the second electrode;
    a cap plate sealing the case, the first and second electrode terminals passing through the cap plate, the cap plate including a short-circuit hole and a conductive groove surrounding the short-circuit hole;
    an inversion plate having a lateral edge fixed to and electrically connected to the conductive groove; and
    a short-circuit member between the second connection plate and the inversion plate, the short-circuit member including a support part and a body part, the support part having an outer diameter that is larger than an inner diameter of the short-circuit hole, wherein:
    the short-circuit member is configured to be pushed toward the second connection plate by inversion of the inversion plate such that the body part is brought into contact with the second connection plate, the contact of the short-circuit member with the second connection plate forming a current path between the second connection plate and the first electrode, and when the body part is brought into contact with the second connection plate, the body part simultaneously contacts the cap plate and the second connection plate.

2. The rechargeable battery as claimed in claim 1, wherein the inversion plate is in the conductive groove of the cap plate when viewed from the electrode assembly.

3. The rechargeable battery as claimed in claim 1, wherein the inversion plate includes round portion that is downwardly convex from the lateral edge.

4. The rechargeable battery as claimed in claim 3, wherein, when an internal pressure of the rechargeable battery reaches a critical value, the round portion of the inversion plate inverts to protrude toward the short-circuit member and is configured to upwardly push the short-circuit member.

5. The rechargeable battery as claimed in claim 1, wherein the conductive groove is on one surface of the cap plate when viewed from the electrode assembly.

6. The rechargeable battery as claimed in claim 1, wherein:

the support part is positioned on a central surface of the inversion plate, and the body part extends from the support part to be inserted into the short-circuit hole of the cap plate, and wherein the support part is between the inversion plate and the body part.

7. The rechargeable battery as claimed in claim 6, wherein an outer diameter of the body part is smaller than or equal to the inner diameter of the short-circuit hole.

8. The rechargeable battery as claimed in claim 6, wherein a height of the body part is greater than a distance from the conductive groove to a bottom surface of the second connection plate facing the cap plate.

9. The rechargeable battery as claimed in claim 6, wherein the body part includes a first body portion extending from the support part, and a second body portion extending from the first body portion and having an outer diameter smaller than an outer diameter of the first body portion.

10. The rechargeable battery as claimed in claim 9, wherein the second body portion has a cross section shaped to be stepped with respect to the first body portion.

11. The rechargeable battery as claimed in claim 9, wherein the second body portion has a cross section shaped to be inwardly inclined with respect to the short-circuit hole.

12. The rechargeable battery as claimed in claim 9, wherein a height of the second body portion is smaller than a distance from the conductive groove to a bottom surface of the second connection plate facing the cap plate.

13. The rechargeable battery as claimed in claim 1, further comprising an insulation layer on a surface of the inversion plate.

14. The rechargeable battery as claimed in claim 13, wherein the insulation layer is between the inversion plate and the short-circuit member such that the inversion plate and the short-circuit member are electrically insulated from each other.

15. The rechargeable battery as claimed in claim 13, wherein the insulation layer includes a fluoroplastic resin.

16. The rechargeable battery as claimed in claim 1, further comprising an insulation member between the second connection plate and the cap plate, and having a through-hole sized to correspond to the short-circuit hole penetrating the insulation member.

17. The rechargeable battery as claimed in claim 6, wherein the second connection plate is external with respect to the cap plate.

18. The rechargeable battery as claimed in claim 16, wherein when the short-circuit member is inserted into the short-circuit hole of the cap plate and the through hole of the insulation member, opposite lateral sides of the short-circuit member contact opposite lateral sides of the through hole of the insulation member.

\* \* \* \* \*